Figure 13:
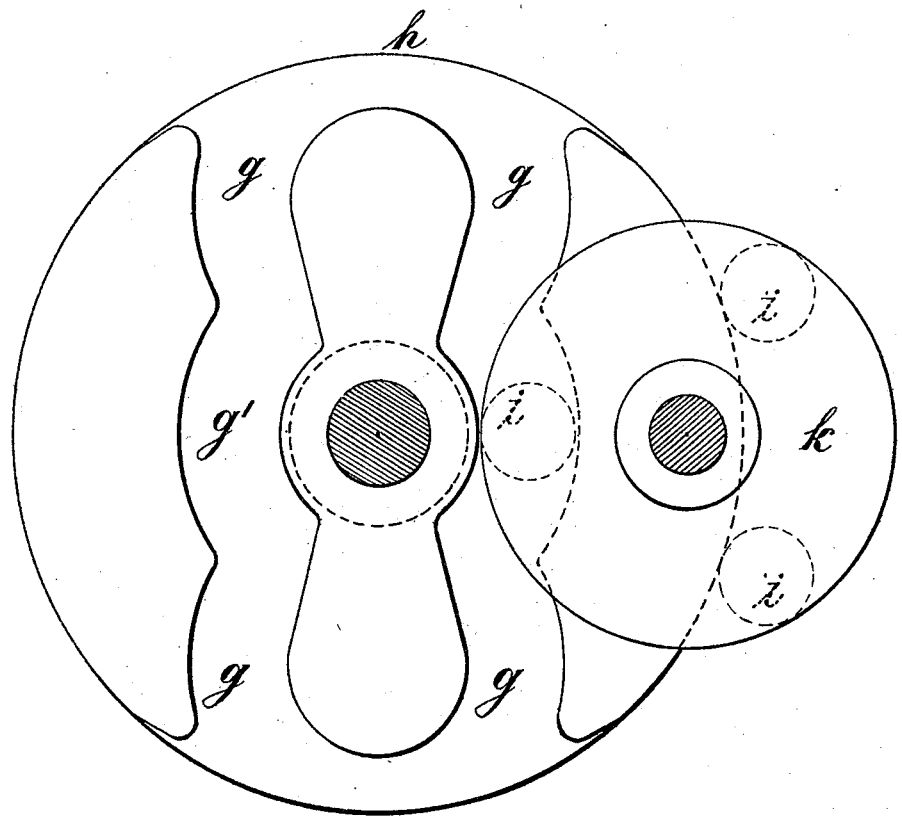

(No Model.) 4 Sheets—Sheet 1.
F. BRACKEMANN.
ROTARY ENGINE.
No. 522,145. Patented June 26, 1894.
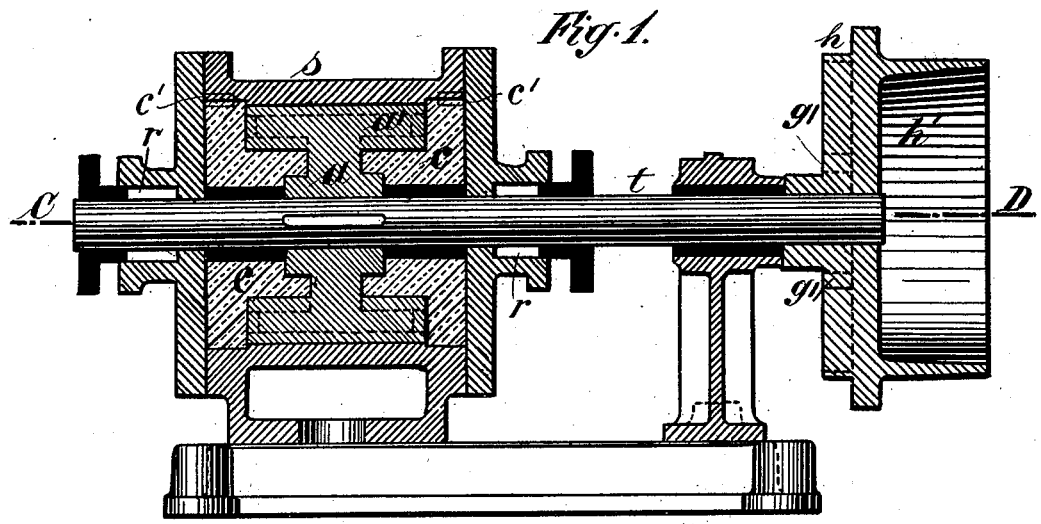
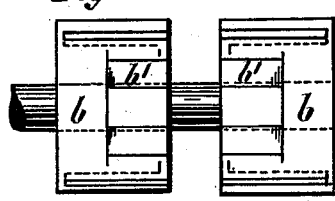
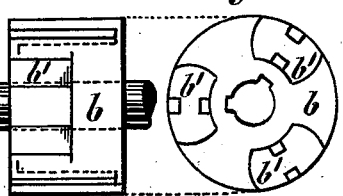
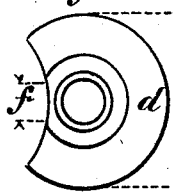
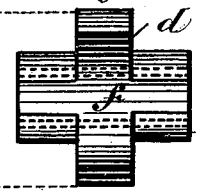
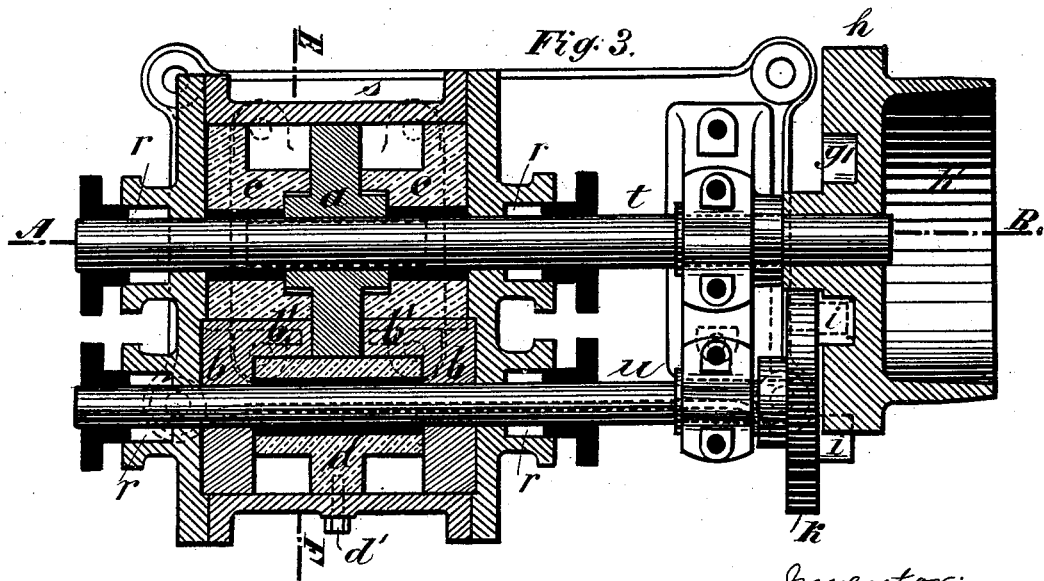
Witnesses:
G. W. Rea.
Thos. A. Green.
Inventor:
Friedrich Brackemann,
By James L. Norris,
Atty.

(No Model.) 4 Sheets—Sheet 2.
F. BRACKEMANN.
ROTARY ENGINE.
No. 522,145. Patented June 26, 1894.
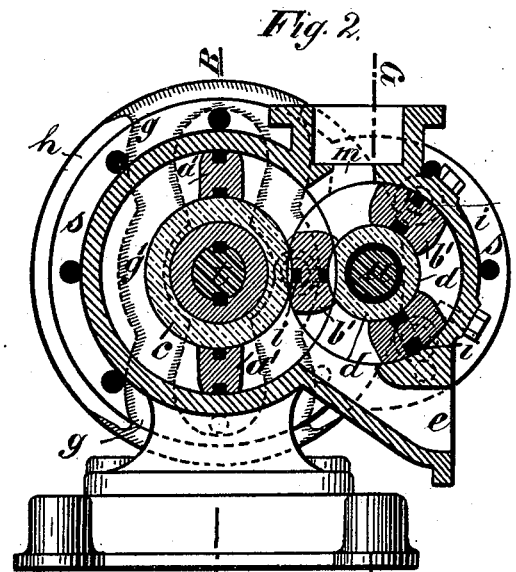
Fig. 2.
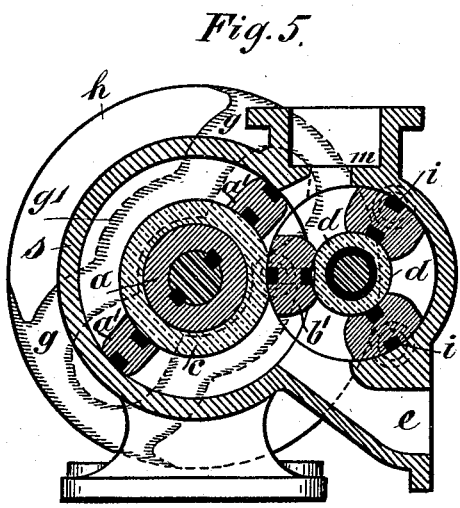
Fig. 5.
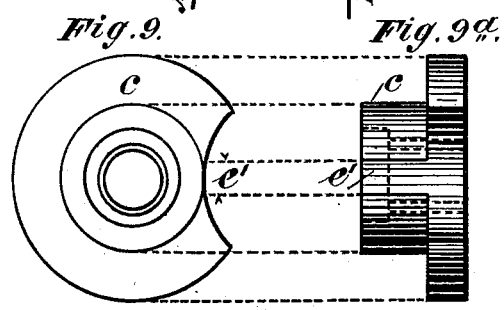
Fig. 9. Fig. 9ª.
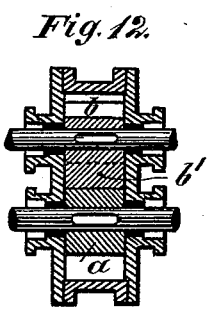
Fig. 12.
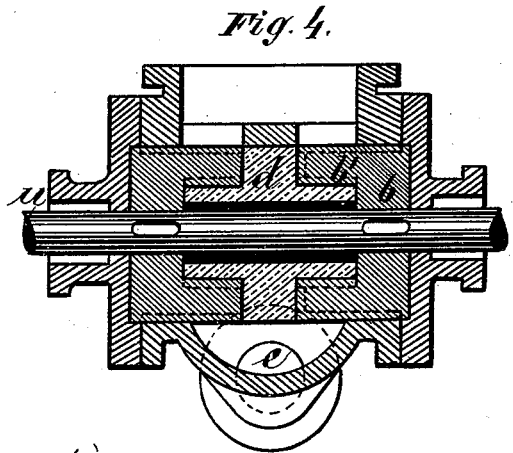
Fig. 4.
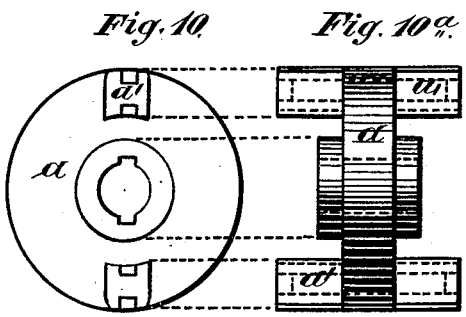
Fig. 10. Fig. 10ª.
Witnesses:
G. W. Rea.
Thos. A. Green
Inventor:
Friedrich Brackemann,
By James L. Norris,
Atty.

(No Model.) 4 Sheets—Sheet 3.
F. BRACKEMANN.
ROTARY ENGINE.
No. 522,145. Patented June 26, 1894.
Fig. 6.
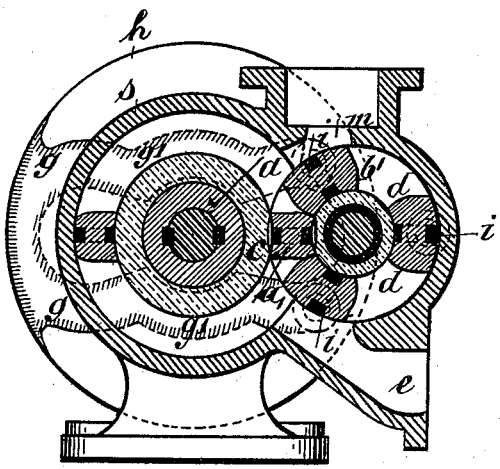
Fig. 12ª. Fig. 12ᵇ. Fig. 12ᶜ. Fig. 12ᵈ.
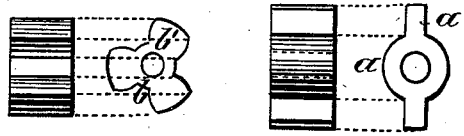
Fig. 11.
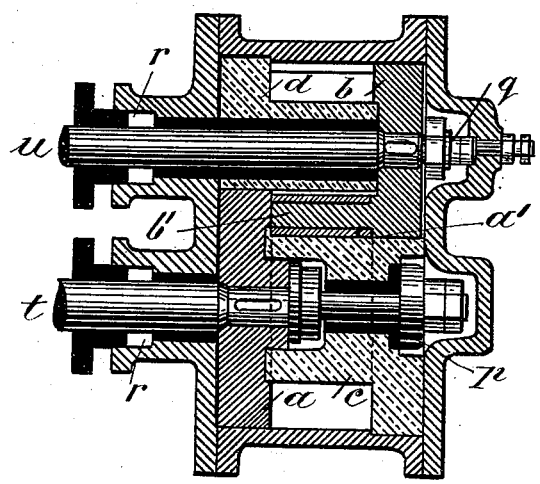
Witnesses:
G. W. Rea.
Thos. A. Grun.
Inventor:
Friedrich Brackemann,
By James L. Norris
atty.

(No Model.)  
4 Sheets—Sheet 4.

F. BRACKEMANN.
ROTARY ENGINE.

No. 522,145.  
Patented June 26, 1894.

Witnesses:  
G. W. Rea,  
Dennis Sumby.

Inventor:  
Friedrich Brackemann,  
By James L. Norris.  
Atty

UNITED STATES PATENT OFFICE.

FRIEDRICH BRACKEMANN, OF AUGSBURG, GERMANY.

ROTARY ENGINE.

SPECIFICATION forming part of Letters Patent No. 522,145, dated June 26, 1894.

Application filed March 23, 1893. Serial No. 467,351. (No model.)

*To all whom it may concern:*

Be it known that I, FRIEDRICH BRACKEMANN, of Augsburg, in the Kingdom of Bavaria and German Empire, have invented a certain new and useful Improvement in Rotary Engines, of which the following is a specification, reference being had to the accompanying drawings.

My invention relates to rotary engines to be driven by a fluid medium, such as steam or water, and also capable, as usual in engines of this kind, of being employed as pumps, and the object of my invention is to provide improved means for insuring an easy and quiet motion of the working parts of the engine and consequently a higher useful effect.

The engine consists in a casing composed of two segments of cylinders and having induction and eduction orifices, two shafts mounted in said segments coaxially therewith and two wheels keyed on the shafts and carrying wings that rotate in contact with the inner surfaces of the respective portions of the casing. One of these wheels, which may be termed the main or power-wheel, is designed to receive the pressure of the operating medium and to be rotated thereby, while the other wheel, to be called the auxiliary wheel, has the office to constitute, by means of its wings, a partition-wall that prevents the passage of the operating medium by the side of the main wheel, while it allows the wings of the latter to pass through the spaces between its own wings. For this purpose the auxiliary wheel has alternately to be kept stationary and to be rotated by an angle corresponding to the distance from one of its wings to the other. The mechanism whereby this is attained, consists in a cam-disk, keyed on the shaft of the main wheel, and a disk provided with studs, which co-operate with the former, the cam-disk being so formed and the studs so distributed that, when a wing of the main wheel has to pass, the stud-carrying disk is rotated by the cam-disk, first with increasing and then with decreasing speed, while in the intervals it is kept locked. Preferably the cam-disk is formed with a groove composed of loops or bows being opposite to the wings of the main wheel, and intermediate portions concentric to its axis of rotation.

In view of attaining the possible greatest tightness between the working and the stationary parts, there are fixed in the casing two flanged bushes loosely surrounding the two shafts, and the wheels are constructed to form disks from the faces whereof the wings project in opposite directions, so that the wings of one wheel extend from the right to the left, those of the other wheel from the left to the right through the spaces formed between the casing, the bushes and their flanges. In view of avoiding the end thrust inherent in this arrangement, it is advisable to double the same with inverted disposition of disks and wings in one portion relatively to the other. Moreover, for improving the tightness of the joint between the wings and the opposite bushes, the latter are each provided with a curved recess corresponding to the path of the outer edge of the wings.

Figure 14:
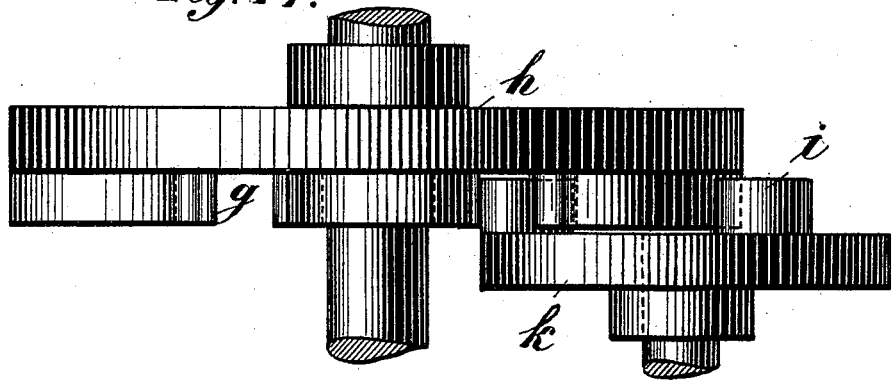

In the annexed drawings Figure 1 is a vertical longitudinal section of a rotary engine comprising my improvements, the section being taken on line A—B, Figs. 2 and 3. Fig. 2 is a transverse section on line E—F, Fig. 3, looking to the right. Fig. 3 is a horizontal section on line C—D, Fig. 1. Fig. 4 is a vertical section on line G—H, Fig. 2. Figs. 5 and 6 are transverse sections alike to Fig. 2, but with the operating parts in different positions. Figs. 7 and 7$^a$ show, respectively in elevation and end-view, the auxiliary wheel of the engine represented by Figs. 1 to 6. Figs. 8 and 8$^a$ are an end view and elevation of the bush belonging to the said auxiliary wheel. Figs. 9 and 9$^a$ show in like views one of the two bushes to the main wheel, while Figs. 10 and 10$^a$ represent the main wheel itself. Fig. 11 is a horizontal sectional view of an engine in which the two wheels have wings on one side only. Fig. 12 represents in longitudinal section an engine not provided with bushes. Figs. 12$^a$ and 12$^b$ show the auxiliary wheel and Figs. 12$^c$ and 12$^d$ the main wheel belonging thereto. In Figs. 11 and 12 the cam-disk and the stud-carrying disk are omitted. Figs. 13 and 14 are enlarged plan and side views, respectively, of the cam disk and the stud-bearing disk.

In Figs. 1 to 6 *s* is the casing of the engine composed of two segments of cylinders, one for the location of the main wheel *a a'*, the other for that of the auxiliary wheel *b b'*, these wheels being keyed on the respective shafts $t$ and $u$. The main wheel consists in the boss and disk $a$ (see also Figs. 10 and 10$^a$) and the wings $a'$ projecting from both faces of the disk, there being on each face two wings placed diametrically opposite to each other.

The letter $r$ designates packings, which may, however, be omitted. On both sides of the main wheel are placed the bushes $c$, one of which is represented separately by Figs. 9 and 9$^a$, these bushes having flanges adapted to the heads of the casing, the spaces left between the bushes, the casing and the disk $a$ being the chambers in which the wings $a'$ rotate. The auxiliary wheel is composed of two portions, as shown to best advantage by Fig. 7, each portion consisting in the disk $b$ applied to the corresponding head of the casing, and three wings $b'$ extending from the disk inwardly into the casing and to the disk $a$ of the main wheel.

Between the disks $b$ is placed the bush $d$ (see also Figs. 8 and 8$^a$), having a central flange, equal in width to the disk $a$ and arranged opposite thereto, so that the surfaces of disk $a$ are flush with those of the flange of bush $d$. Besides this, the inner surfaces of the disk $b$ and of the flanges of bushes $c$ are in planes with each other, and the edges of the wings $b'$ are in contact with the bush $d$ and the corresponding portion of the casing. The bushes are fixed in the casing by keys $c'$ and screw $d'$. The flanges of the bushes have curved recesses formed to the shape of the opposite disks $a$ and $b$, and these recesses extend into the cylindrical portions of the bushes, as shown at $f$, Figs. 8, and 8$^a$, and $e'$, Figs. 9, and 9$^a$, in order to provide for the outer edges of the wings $a'$ and $b'$ surfaces of contact of a certain width.

In one end of the shaft $t$ is keyed the disk $h$, having the cam-groove $g\ g'$, and on the corresponding end of the shaft $u$ the disk $k$, fitted with three studs $i$, adapted to engage in the said cam-groove. These studs are preferably provided with rollers. The cam-groove is formed with two loops or bows $g$, Figs. 2, 5 and 6, being opposite to the wings $a'$, and two portions $g'$ concentric with the shaft $t$. The loops $g$ are open at the periphery of the disk. The studs $i$ are placed opposite to the wings $b'$. To the disk $h$ is attached the driving-pulley $h'$. Supposing now, that the driving medium, say steam, is introduced through channel $e$, and that the movable parts are in the position shown by Fig. 2, the wing $b'$ which is directed at the time toward the bush $c$, keeps the space between the bushes $c$ and $d$ closed, thus preventing at this point a passage of steam. The steam consequently acts on the wing $a'$ being at the bottom and rotates the wheel $a\ a'$, while the spent steam leaves the casing through orifice $m$. The wheel $b\ b'$ is maintained stationary by the two outer studs $i$ bearing against the periphery of disk $h$, which, as it were, forms a prolongation of one face of the cam-groove. When the parts have come into the position shown by Fig. 5, the upper wing $a'$ being then close to the wing $b'$ standing horizontally, the upper loop-shaped portion $g$ of the cam-groove pushes the pin being engaged in the groove, downward and consequently rotates wheel $b\ b'$. When the said wing $b'$ is about to come out of contact with bush $c$, the upper wing $a'$, which has passed into the space between two wings $b'$, enters into contact with bush $d$, as represented in Fig. 6, and closes the space between the two bushes, until, by the further operation of the cam-groove on the pins $i$, it is relieved of this function by the wing $b'$ following the same.

In the described engine the pressure of the operating medium acts on each wheel endwise in two opposite directions, so that the axial pressures are balanced. If this advantage is considered unimportant, as may be the case when the pressure of the operating medium is low, the simplified construction of engine shown by Fig. 11 may be employed, in which the disks $a$ and $b$ are placed at opposite ends of the casing and provided each on one face only with wings. In order, however, to avoid friction between the disks $a\ b$ and the heads of the casing, and to allow of proper adjustment, the shafts $t$ and $u$ are fitted with adjustable thrust-bearings $p$ and $q$. Figs. 12 to 12$^d$ finally show an engine not having any bushes and in which the closure of the space between the two wheels is brought about by the contact of the wings of one wheel with the boss of the other wheel. This engine is only adapted for low water-pressure.

The described engines may, without any alteration, be used as pumps by being driven by power applied to the shaft $t$ from the outside.

Compared with other rotative engines of the same kind, my improved engine presents the following advantages. The particular combination of the main wheel and the auxiliary wheel together with the means employed for the transmission of motion from the one to the other insures an easy and quiet motion and consequently a higher useful effect. The operative parts are arranged to reduce the leakage of steam or water to the smallest amount possible. On account of the equilibration of the said parts, the power consumed by friction and wear is less than otherwise. Finally if the engine is driven by water, or if it is used to pump water, an advantage is attained from the greater uniformity of speed of the water during its passage through the engine.

Having thus fully described my invention, what I desire to claim and secure by Letters Patent is—

1. The combination of a casing composed of two segments of cylinders and provided with induction and eduction orifices, two shafts mounted in said segments coaxially therewith, two wheels, that is to say, the main wheel $a\,a'$ and the auxiliary wheel $b\,b'$, consisting in disks $a$, $b$, keyed on the respective shafts and having wings $a'$, $b'$, projecting in opposite directions from their faces, the wings $a'$ being adapted to engage between the wings $b'$, two flanged bushes $c$, $d$, fixed in the casing and having curved recesses $e'$, $f$, the wings $a'\,b'$ rotating with their outer edges in contact with the casing and the surfaces of the recesses $e'\,f$, while with their terminal and their outer edges they are in contact with the bushes $c\,d$, and means as described whereby when the wings $a'$ engage between the wings $b'$, the wheel $b\,b'$ is rotated through the wheel $a\,a'$, while in the intervals it is locked, substantially as specified.

2. The combination of a casing composed of two segments of cylinders and provided with induction and eduction orifices, two shafts mounted in said segments coaxially therewith, two wheels, that is to say, the main wheel $a\,a'$ and the auxiliary wheel $b\,b'$ keyed on said shafts and having the respective wings $a'$ and $b'$, which rotate in contact with the inner surfaces of the casing, the wings $a'$ being adapted to engage between the wings $b'$, the disk $h$ keyed on the shaft of the wheel $a\,a'$ and having a cam-groove, and the disk $k$ keyed on the shaft of wheel $b\,b'$ and having, opposite to the wings $b'$, studs $i$ engaging in said cam-groove, the latter forming, opposite to the wings $a'$, loops $g$, while the portions thereof being between the loops, are concentric to the shaft of the wheel $a\,a'$, substantially as set forth.

3. In a rotary engine adapted to be employed also as a pump, and having two wheels provided with radial wings and rotatably mounted within a common casing, the wings of the one wheel during the rotation of both being adapted to coincide with the spaces between the wings of the other wheel, a disk mounted in driving connection with the shaft of one of the said wheels and having on its face a cam-groove composed of loop-shaped portions alternating with partly circular portions, and a disk mounted in driving connection with the shaft of the other wheel and having on one of its faces a number of studs adapted during the rotation of the two disks to successively engage, and to be guided in, the said cam-groove of the other disk, substantially as and for the purpose set forth.

4. In a rotary engine adapted to be employed also as a pump, the combination, with two wheels provided with radial wings as described and rotatably mounted within a common casing, the wings of the one wheel during the rotary movement of both being adapted to coincide with the spaces between the wings of the other wheel, of a stationary flanged bush surrounding the axis of one of the wheels and conforming to the shape of the inner cylindrical and face portions of the said wheel, the said bush having on its periphery a curved recess conforming to the outer cylindrical surfaces of the other wheel and its wings coming in contact therewith; and two other stationary bushes laterally inclosing the last named wheel and conforming to the inner cylindrical and face portions of the same, each of the said two bushes having on their peripheries a curved recess conforming to the outer cylindrical surfaces of the first wheel and its wings coming in contact therewith, substantially as and for the purpose set forth.

In testimony whereof I have signed my name to this specification in the presence of two subscribing witnesses.

FRIEDRICH BRACKEMANN.

Witnesses:
B. HESS,
W. MÜLLER.